United States Patent [19]

Hargett et al.

[11] 4,176,165

[45] Nov. 27, 1979

[54] TREATMENT OF ALKYL LEAD-CONTAINING GAS STREAM

[75] Inventors: William D. Hargett; Thorowgood T. Broun, both of Beaumont, Tex.

[73] Assignee: PPG Industries, Inc., Pittsburgh, Pa.

[21] Appl. No.: 958,861

[22] Filed: Nov. 8, 1978

Related U.S. Application Data

[63] Continuation-in-part of Ser. No. 863,275, Dec. 22, 1977, abandoned.

[51] Int. Cl.² ............................................. B01D 53/34
[52] U.S. Cl. .................................... 423/245; 423/210; 423/619; 75/77; 260/437 R
[58] Field of Search .................. 423/210, 245, 619; 55/72; 260/437 R; 75/77, 78

[56] References Cited

U.S. PATENT DOCUMENTS

| | | | |
|---|---|---|---|
| 2,777,866 | 1/1957 | Blitzer et al. | 260/437 |
| 3,403,495 | 10/1968 | Jaasma | 55/72 |
| 3,413,328 | 11/1968 | Feehs | 260/437 |
| 3,453,081 | 7/1969 | Walker | 260/437 |
| 3,767,687 | 10/1973 | Harris | 260/437 R |
| 3,770,423 | 11/1973 | Lores et al. | 75/108 |
| 4,013,456 | 3/1977 | Bergsoe | 75/77 |

FOREIGN PATENT DOCUMENTS

127263  7/1959  U.S.S.R. ........................... 423/210 M

Primary Examiner—Earl C. Thomas
Attorney, Agent, or Firm—Walter M. Benjamin

[57] ABSTRACT

Method of removing alkyl lead from air and other gases by contacting said air or other gas with at least a catalytic amount of lead dioxide at temperatures in the range between 60° C. and 225° C.

19 Claims, 3 Drawing Figures

TREATMENT OF ALKYL LEAD-CONTAINING GAS STREAM

CROSS REFERENCE TO RELATED APPLICATION

This application is a continuation-in-part of commonly assigned co-pending application Ser. No. 863,275, filed Dec. 22, 1977, and now abandoned.

BACKGROUND OF THE INVENTION

This invention relates to removing alkyl lead from gaseous streams, and particularly relates to reducing the concentration of alkyl lead that is present in process air streams of a tetralkyl lead plant.

In a widely used commercial process for the preparation of tetralkyl lead, a lead-sodium alloy is reacted in an autoclave with an alkyl halide, usually methyl chloride or ethyl chloride. Much of the lead remains unreacted in the product in the form of a sludge. The product is steam distilled for recovery of the alkyl lead, and the sludge residue is then sent to a holding pit where some sodium chloride formed in the reaction is washed out. The remainder is dried and purified in a lead smelting furnace. The purified lead is made into a lead-sodium alloy and recycled for further reaction with alkyl halide.

In the smelting furnace, the washed sludge residue is simply melted down, forming a pool of molten lead covered with slag. In a typical reverberatory smelting furnace, flames from forced air burners are directed over the sludge at temperatures typically between about 590° C. to about 810° C. This creates flue gases containing substantial amounts of dust, which must be removed before the gas is vented to the atmosphere. Therefore, the gas is passed through bag filters where particulate lead compounds, dust, and other solid particles are removed and from which substantially particle free gas is vented. Other devices can be used to remove the dust, such as cyclones and electrostatic precipitators.

In a process of manufacturing a toxic substance such as tetraalkyl lead, such as described above, great care is taken to avoid exposure of workers to harmful concentrations that may be unavoidably or inadvertently released to their environment. As a result, ventilating systems of very high capacity are used to keep the tetraalkyl lead content of the air in the manufacturing buildings at safe levels. If the contaminated ventilating air is passed directly to the atmosphere, even though the lead concentration in the vented air is low, the volume of air is so great that a significant amount of lead may be emitted. From a tetraalkyl lead plant of substantial size, undesirable amounts of lead may be lost each day in this way.

U.S. Pat. Nos. 3,403,495 and 3,413,328 describe the recovery of tetraalkyl lead from gaseous streams by scrubbing with an inert organic liquid. These processes are well adopted to recovery of tetraalkyl lead from streams of relatively small volume and relatively high concentration, but they become less pratical as the process stream volume increases and the concentration of the tetraalkyl lead in the contaminated stream decreases.

SUMMARY OF THE INVENTION

It has now been discovered that the alkyl lead content of a gaseous stream can be reduced by contacting the stream with at least a catalytic amount of lead dioxide and preferably an oxidizing amount of lead dioxide. In one embodiment, the gaseous stream is contacted with a lead dioxide containing material, e.g., dust obtained from the flue gas of a lead smelting furnace. In a preferred embodiment, the gaseous stream is mixed with unfiltered lead furnace flue gas and the mixture is passed through a filter on which lead dioxide-containing dust from the furnace is present.

This invention is particularly useful for sharply reducing the alkyl lead content of high volume streams such as process ventilation air streams in order to reduce lead emissions and to capture the otherwise lost lead in recoverable form.

BRIEF DESCRIPTION OF THE DRAWINGS

The present invention will be better understood and further benefits and advantages will become apparent from the detailed description below made with reference to the accompanying drawings wherein.

DETAILED DESCRIPTION OF THE INVENTION

Figure 1:
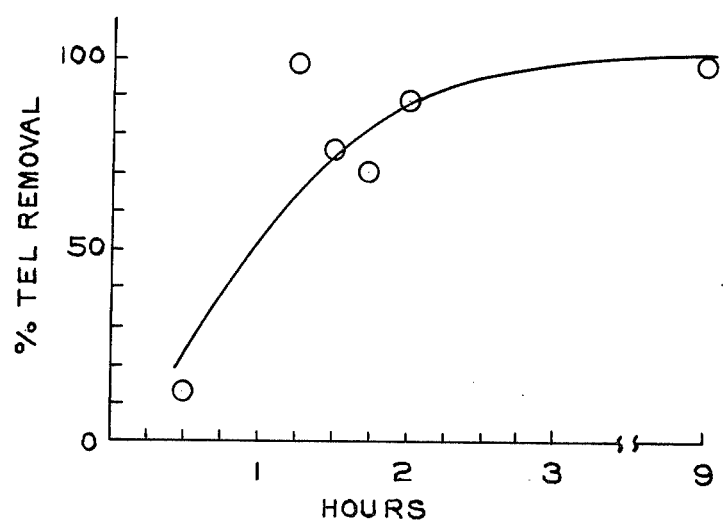
FIG. 1 is a graph showing the percentage of tetraethyl lead removed versus time from a 200° C. process stream flowing at 150 cc/min.

The present invention is based on the discovery that lead dioxide, e.g., lead dioxide-containing dust produced by a lead smelting furnace, is effective in lowering the concentration of alkyl lead in gas streams contaminated with alkyl lead, preferably air streams contaminated with alkyl lead and more preferably air streams contaminated with tetraalkyl lead, e.g., process air streams contaminated with tetraethyl and tetramethyl lead.

Lead is removed by contacting intimately the contaminated lead-sodium stream with at least a catalytic amount of lead dioxide, and preferably an oxidizing amount of lead dioxide. Pure lead dioxide is preferred in the practice of this invention. However, materials containing lead dioxide may be used. It is only required that an adequate surface area of lead dioxide be exposed from the surface of the lead dioxide-containing material. A lead dioxide-containing material which has been found especially useful in the practice of this invention is the dust which is obtained when the washed sludge residue from the reaction of leadsodium alloy with an alkyl chloride is smelted accordiing to the method described above or a similar method of producing tetraalkyl lead. The dust contains sodium chloride, massicot (unfused lead oxide), litharge (fused lead oxide), lead metal, and unknowns. The compositions of the dust varies widely, depending upon the sample taken, the way sludge is fed to the furnace, operating temperatures, and other factors. Thus, samples taken from the same furnace at different times has 10 to 40 percent sodium chloride, 0 to 35 percent massicot, 10 to 50 percent litharge, 0 to 5 percent lead metal, and 15 to 70 percent unknowns, as determined by X-ray diffraction. But, it is believed that lead dioxide will usually be present and exposed in sufficient quantities in the dust.

In a tetraalkyl lead plant where a smelting furnace is used to purify lead for recycle, the most preferred means of contacting the gaseous stream with the lead dioxide-containing material is a conventional bagfilter used to collect dust from the flue gas of the furnace. The gaseous stream may be introduced into the bagfilter directly, but it is preferable to mix the stream with furnace gas first, thereby tempering the flue gas before it enters the bagfilters. The life of the bagfilters is prolonged if the temperature is high enough to keep moisture vaporized (i.e., greater than about 100° C.) and low enough so the bag material will not oxidize (i.e., less than 250° C.). Generally the bag filter temperature should be about 150° C.

Of course other conventional means of contacting the gas stream with the lead dioxide can be used, such as fixed beds, fluidized beds, other porous supports, or a suspension of particulate lead dioxide, containing material in the gas stream. In the last case, the material may be removed from the gas stream in a cyclone for recycling. A lead dioxide-containing material, such as the dust from a lead smelting furnace, may be formed into pellets or beads for use in fixed or fluidized beds, or inert supports may be coated with the material. Any conventional support, preferably porous, such as alumina, attapulgite clay, titania, and charcoal, may be also used. Even further, a layer of particulate lead dioxide-containing material may be placed on a porous support such as a glass frit.

In the practice of this invention, the alkyl lead containing gaseous stream is contacted with at least a catalytic amount of lead dioxide and preferably an oxidizing amount or more of lead dioxide. It is not known by what mechanism the decomposition of alkyl lead takes place by the process of this invention, but from the experimental evidence at hand, it is believed that the lead in the alkyl lead is converted to lead dioxide ($PbO_2$). The experimental evidence also shows that the lead dioxide acts as a catalyst and/or as a oxidizing agent (possibly depending upon which crystalline form of lead dioxide has been contacted). It is also not known what is the source of the oxygen, i.e., whether the oxygen comes from the air, whether lead oxides are reduced or whether there is some other source. It is known that the lead dioxide should be intimately contacted, preferably over a large surface area, which is determined by its physical form. An amount which has shown to be effective is between about 15 square meters surface area of lead dioxide per cubic centimeters of gas treated to about 350 square meters per cubic centimeter of gas treated. The above described finely divided material from a lead smelting furnace will fall within this range, e.g., BET surface areas ranging from about 1.6 to about 6.6 square meters per gram, particle sizes ranging from 0.3 to 6.4 micron, and a median particle size of 0.8 to 1.1 microns. The quantity of lead dioxide in the material and the surface area of lead dioxide exposed can vary, depending upon the volume of the gas to be treated, the alkyl lead content of the gas, and the contact times. For the treating of process air streams such as may be found in a tetraalkyl lead plant, it is preferred that the BET surface area of lead dioxide exposed be about 0.5 to about 3.5 square meters per gram, more preferably, 1.7 to 3.3 square meters per gram.

Gaseous streams which can be treated in accordance with this invention are those contaminated with less than 1 pph and preferably less than 1000 ppm alkyl lead, notably tetraalkyl lead such as tetraethyl lead, tetramethyl lead, mixed alkyl leads such as those produced by redistribution reactions of tetramethyl lead and tetraethyl lead, and mixtures thereof. The streams may arise from the purging of autoclave, stills, and other equipment such as storage vessels and, primarily, from the ventilation of work areas in tetraethyl lead plants. The alkyl lead content in tetraethyl lead plants will typically vary from 0.35 to 3500 milligrams, more often 17 to 1700 milligrams per standard cubic meter of gas. Gaseous streams having a higher content of tetraalkyl lead, e.g., 1 pph, can also be treated.

In accordance with the aforestated belief of what mechanism the decomposition of alkyl lead takes place, in the case where lead dioxide acts as a catalyst, it is preferred that the contaminated gas contain the stoichiometric amount of oxygen to convert the lead in the alkyl lead to lead dioxide, but more preferably an amount which is far in excess of the stoichiometric amount to completely oxidize the alkyl lead. If oxygen is not already present in the contaminated gas, it may be provided by mixing air, oxygen, or oxygen enriched air with the contaminated gas. The mixture may be made before or during contact with the lead dioxide. The amount of oxygen is not critical, however, since in accordance with the aforestated belief of the mechanisms of the reaction, the lead dioxide contacted may act as an oxidizing agent. In this case very little, and certainly less than the stoichiometric amount of oxygen need be present in the contaminated gas stream.

Treatment of the gas contaminated with alkyl lead by contact with lead dioxide has been found to be effective at temperatures ranging from about 100° C. to about 225° C. Higher or lower temperatures may also be used if desired, but heat decomposes alkyl lead at an increasing rate at temperatures above 220° C. Of course, it follows that the higher the temperatures the greater the decomposition and the lesser the need for the lead dioxide, but moderate temperatures can represent a significant savings in heat energy. If an alkyl lead contaminated air stream is to be mixed with a furnace flue gas, part of the heat energy from the flue gas furnace could be used to raise the temperature of the alkyl lead contaminated gas to 100° C. and the remainder could be used for other purposes in the tetraethyl lead plant. If no other use of the remainder heat is necessary, optimum advantage can be taken of the cooling effect of the contaminated gas stream by introducing enough of the gas stream to lower the temperature of the furnace flue gas to 100° C. However, the flue gas should not be reduced below 100° C., because the percent of tetraalkyl lead removed is significantly reduced and the possibility of accumulation of moisture on the filter is increased.

The pressure at which this invention is carried out should not be a significant factor. If a baghouse filter for furnace flue gases is used as a contacting medium and as a source of lead dioxide, care should be taken to admit alkyl lead-contaminated gas into the baghouse filter when there is an adequate layer of dust having enough contact area on the filter bags. However, the dust thickness should not be so great that the pressure drop becomes so large that pumping is necessary or so low that flow rates through the filter fall below undesired levels.

Contact times between the contaminated gas and the lead dioxide may be very short. For example, assuming a flow rate of 0.2 standard cubic meters per minute per square meter, and a lead dioxide dust layer thickness of an average of about 0.11 centimeter, a contact time of 0.01 to 0.8 second may be estimated. Of course, longer contact times are also useful, but may not be necessary. First of all, typical bag filters as used in a tetraalkyl lead plant should have a useful flow rate of between about 30 and 200 standard cubic centimeters of gas per minute per square centimeter of bag cloth when the dust layer on this cloth is between about 0.08 and 0.14 centimeter thick. Secondly, the flow rate through the bag filters will depend upon the concentration of alkyl lead in the gas streams being treated, the composition of the lead furnace dust, and the thickness of the dust layer. Thus, it is not possible to predict the best flow rate and dust layer thickness for every circumstance, nonetheless, it is preferred that the flow rate not be so great that the contact time is less than 0.01 second. Further, the dust layer thickness is limited by the maximum tolerable pressure drop across the filter. These variables can be optimized very simply by measuring the alkyl lead content of the exhaust gas coming from the baghouse and making appropriate adjustments.

Some baghouse dust from flue gases of tetraalkyl lead plants and which is used as a source of lead dioxide may require an induction period of contact before alkyl lead removal takes place. It is not fully understood but it is thought that alpha-lead dioxide (a crystalline structure of lead dioxide) is formed either by crystal growth or modification of some lead compound already present in the baghouse dust, by tetraethyl lead decomposition or both thereby enhancing removal. In any event it can take up to about 3 hours after contact to effect activation in gray baghouse dust sufficient to obtain up to about 98 percent tetraethyl lead removal, for example, from a process air stream. After the induction period is complete, full activity of the gray baghouse dust is attained.

The useful capacity of the lead dioxide for removing alkyl lead from a gaseous stream is also difficult to predict. However, periodic analysis of the gas for alkyl lead after contact with the lead containing material will indicate when the material must be replaced. Usually, where smelting furnace bagfilters are used, the filters would not have to be replaced or regenerated owing to loss of activity because it is thought that lead dioxide is produced and deposited on the filter surface during decomposition of alkyl lead, thereby aiding in further removal of alkyl lead from the gas stream. Therefore, it is within the contemplation of this invention that the lead in the dioxide may initially be produced by heat decomposition of the alkyl lead in the contaminated gas stream and subsequently used to actively remove alkyl lead compounds at lower temperatures. After activity of the lead dioxide has begun and dust has accumulated on the surface of the filter, requiring purging from the filter, dust should be removed from the filter only to the extent of leaving a residual layer to initiate subsequent decomposition.

The lead removed from the treated stream is retained upon the lead dioxide-containing dust and may be recovered by conventional techniques along with the other lead in the material, such as by the techniques used to reclaim lead from lead smelting furnace dust.

The following laboratory-scale experiments illustrate how the present invention may be practiced and indicate the results which may be obtained.

EXAMPLE I

An apparatus was set up to test for tetraalkyl lead removal from air stream. Five (5) milliliters of tetraethyl lead was pipetted into a flask and the temperature adjusted to vaporize the desired amount. Compressed air which had been metered and filtered through a carbon filter was then fed into the flask containing the tetraethyl lead. The tetraethyl lead-air stream mixed in the flask was fed to another flask which was stirred to level out variations in tetraethyl lead concentrations. An oven with a thermo watch to control the temperature contained a gas sample filter holder and could heat the filter holder to a desired temperature. The filter was comprised of two NOMEX ® (a trademark of DuPont for polyester filter cloth) bag filter cloths sandwiching the test material for uniform thickness leaving an open area of 1.76 squared centimeters. The sandwich was held in place by a stainless steel screen and screw plug. Provisions was made in the gas sample filter holder so that a small sample of the tetraethyl lead-air stream could be taken immediately before and immediately after it passed through the sandwich filter. The tetraethyl lead-air stream was fed through the filter holder in the oven and subsequently metered to check for leaks. The sample stream exited through a tube dipped in water to provide back pressure for sampling. After the tetraethyl lead-gas stream had run long enough to stabilize, the oven was turned on to bring the sample filter to the desired temperatures. The gas samples taken before and after the tetraethyl lead-gas stream passed through the test filter material was taken alternately and fed through a calibrated loop attached to a gas chromatograph sampling valve. Samples from ahead of and behind the test filter material could be scanned within 20 minutes. The results shown in FIGS. 1 through 3 and Tables I through IV are averages of many scans over a period of operation.

With the apparatus described 362 milligrams of reagent grade lead dioxide, revealed by X-ray diffraction data to be the only compound present, was spread over the filter cloth and placed in the filter holder to test its catalytic activity to decompose tetraethyl lead in the gas stream. A gas stream containing 2000 ppm tetraethyl lead was reduced to 240 ppm tetraethyl lead at 100° C. (See Table I, FIG. 1).

EXAMPLE II

With the apparatus described in Example I, 100 milligrams of gray baghouse dust, not identifiable by X-ray diffraction to contain compounds of concern before testing, was tested as in Example I. A gas stream containing 1200 ppm tetraethyl lead was reduced to 180 ppm of tetraethyl lead at 200° C. (See Table I and FIG. 3). After testing the gray baghouse dust, X-ray diffraction data was taken and revealed that a major portion of the gray baghouse dust was alpha-lead dioxide (-PbO$_2$).

EXAMPLE III

Figure 2:
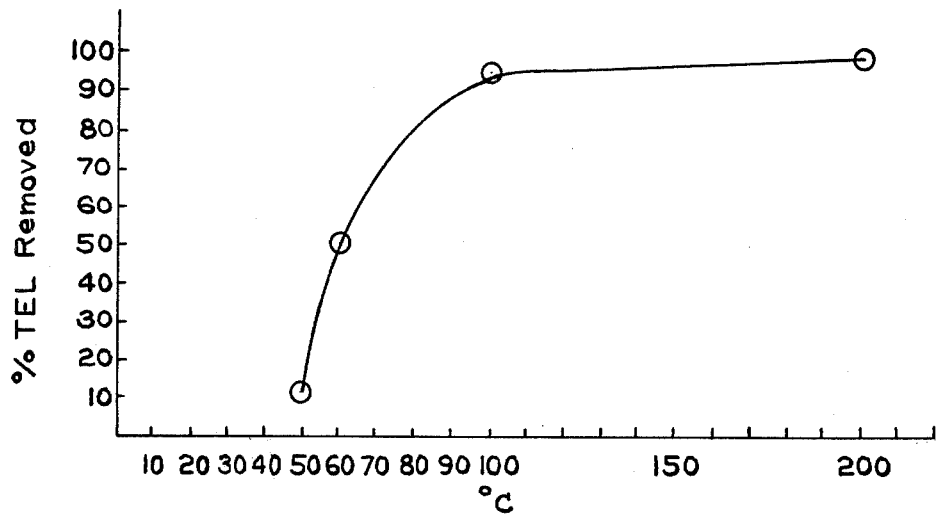
FIG. 2 is a graph showing the effect of temperature on the percentage of tetraethyl lead removal at a process air stream flow rate of 150 cc/mm.
Figure 3:
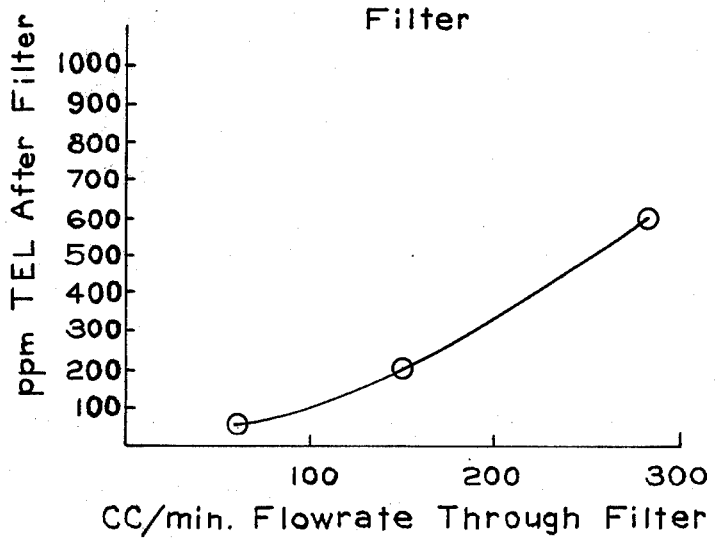
FIG. 3 is a graph showing the effect of retention time on the amount of tetraethyl lead removed from a process air stream at 100° C.

With the apparatus as described in Example I, 145 milligrams of gray baghouse dust described in Example II, was tested as in Example I. A gas stream containing 6000 ppm tetraethyl lead was reduced to 2700 ppm at 200° C. Again, after testing, X-ray diffraction data revealed that the gray baghouse dust contained a major portion of alpha-lead dioxide (-PbO$_2$) (see Tables I, II, and III; FIGS. 1 and 2).

EXAMPLE IV

With the apparatus as described in Example I, 60 milligrams of yellow baghouse dust, revealed by X-ray diffraction data to be lead (II) oxide (PbO) and lead oxide chloride ($3PbO \cdot PbCl_2 \cdot nH_2O$) along with other unidentifiable material, was tested as in Example I. This test revealed that only a nominal amount of tetraethyl lead was removed when a gas stream containing 2000 ppm tetraethyl lead was analyzed after filtering at 200° C. (See Tables I, II, and III; FIGS. 1 and 2).

EXAMPLE V

With the apparatus as described in Example I, 46.8 milligrams of gray baghouse dust, not identifiable by X-ray diffraction to contain compounds of concern before testing, was tested as in Example I, except the gas stream contained only 100 ppm free oxygen. In three separate samples the contaminated gas containing 10,000 ppm tetraethyl lead was reduced 22 percent, and in three other samples, 27 percent. After testing the gray baghouse dust, X-ray diffraction data was taken and revealed that a major portion of the gray baghouse dust was alpha-lead dioxide ($\alpha$-$PbO_2$). Hence, it could be seen that removal of tetraethyl lead was attained in the presence of less than the stoichiometric amount of free oxygen present. When an abundance of free oxygen was added to the gas stream the removal increased only to 34 percent (probably owing to such a high concentration of tetraethyl lead in the gas stream).

TABLE I
EFFECT OF LEAD CONTAINING MATERIALS ON TEL REMOVAL FROM AN AIR STREAM
Conditions: 150 cc./min., 200° C.

| Material | TEL Removal, % | Initial TEL, ppm |
|---|---|---|
| Baghouse Dust (Yellow) | 5.3 | 2000 |
| Baghouse Dust (Gray) | 55.0 | 6000 |
| Baghouse Dust (Gray) | 85.0 | 1200 |
| $PbO_2$ | 88.0 | 2000 |
| PbO | 0.8 | 1600 |
| $Pb_3O_4$ | 2.8 | 1900 |

TABLE II
EFFECT OF TIME ON CATALYST ACTIVATION
Conditions: 150 cc/min., 200° C.
Gray Dust

| TEL Removal, % | Time, hrs. |
|---|---|
| 6 | .5 |
| 51 | 1.0 |
| 100 | 1.25 |
| 77 | 1.5 |
| 69 | 1.6 |
| 88 | 2.0 |
| 100 | 8.5 |

TABLE III
EFFECT OF TEMPERATURE ON TEL REMOVAL
Conditions: Flow Rate - 150 cc./min.
Gray Dust

| TEL Removal, % | Temperature |
|---|---|
| 15 | 50° C. |
| 50 | 60° C. |
| 96 | 100° C. |
| 100 | 200° C. |

TABLE IV
EFFECT OF RETENTION TIME ON TEL REMOVAL

Conditions: 100° C.
Initial TEL - 2000 ppm
0.36g $PbO_2$ in Filter

| TEL After Filtering (ppm) | Flow Rate Through Filter (cc./min.) |
|---|---|
| 40 | 60 |
| 200 | 150 |
| 600 | 279 |

Although the present invention has been described with reference to particular details and embodiments, the particulars are not intended to limit the invention; only the limits which are defined by the following Claims are intended. What is claimed is:

1. A method for treating a gaseous stream containing alkyl lead which comprises contacting the gas stream with at least a catalytic amount of lead dioxide at temperatures in the range between 60° C. and 225° C. for a time sufficient to reduce the alkyl lead content of the gaseous stream.

2. The method of claim 1, wherein the gaseous stream is air.

3. The method of claim 1, wherein the amount of lead dioxide is between 15 square meters surface area of lead dioxide per cubic centimeter gas treated to 350 square meters surface area of lead dioxide per cubic centimeter gas treated.

4. The method of claim 1, wherein the volatile alkyl lead is a mixture consisting essentially of tetraethyl lead and tetremethyl lead.

5. The method of claim 1, wherein the alkyl lead is contained in a ventilating air stream.

6. The method of claim 5, wherein the ventilating air stream contain less than 1 part per hundred of alkyl lead.

7. A method for treating an air stream containing alkyl lead which comprises contacting the air stream with dust from a lead smelting furnace at temperatures in the range between 60° C. and 225° C. for a time sufficient to reduce the alkyl lead content of the air stream.

8. The method of claim 7, wherein the air is mixed with a gas stream from the lead smelting furnace and which further comprises filtering the mixture through bags in a baghouse.

9. A method of treating an air stream containing 17 to 1700 milligrams of alkyl lead per standard cubic meter which comprises contacting the air stream with dust from a lead smelting furnace at a temperature in the range between 60° C. and 225° C. for a time sufficient to reduce the alkyl lead content of the air stream.

10. The method of claim 9, wherein the alkyl lead consists essentially of tetramethyl lead and tetraethyl lead.

11. The method of claim 9, wherein the alkyl lead content is reduced below 530 milligrams per standard cubic meter.

12. A method for treating a gaseous stream containing alkyl lead which comprises contacting the gas stream with a catalytic amount of lead dioxide in the presence of at least the stoichiometric amount of oxygen at temperatures in the range between 60° C. and 225° C. for a time sufficient to convert the lead in the alkyl lead to lead dioxide.

13. The method of claim 12, wherein the gaseous stream is air.

14. The method of claim 12, wherein the catalytic amount of lead dioxide is between 15 square meters surface area of lead dioxide per cubic centimeter gas treated to 350 square meter surface area of lead dioxide per cubic centimeter gas treated.

15. The method of claim 12, wherein the alkyl lead is a mixture consisting essentially of tetraethyl lead and tetramethyl lead.

16. The method of claim 12, wherein the alkyl lead is contained in a ventilating air stream.

17. A method for treating an air stream containing alkyl lead which comprises contacting the air stream with lead dioxide containing dust from a lead smelting furnace at temperatures in the range between 60° C. and 225° C. for a time sufficient to convert the lead in the alkyl lead to lead dioxide, the air stream containing at least the stoichiometric amount of oxygen for the conversion.

18. The method of claim 17, wherein the air is mixed with a gas stream from a lead smelting furnace and which further comprises filtering the mixture through bags in a baghouse.

19. The method of claim 17, wherein the alkyl lead consists essentially of tetramethyl lead and tetraethyl lead.

* * * * *